UNITED STATES PATENT OFFICE.

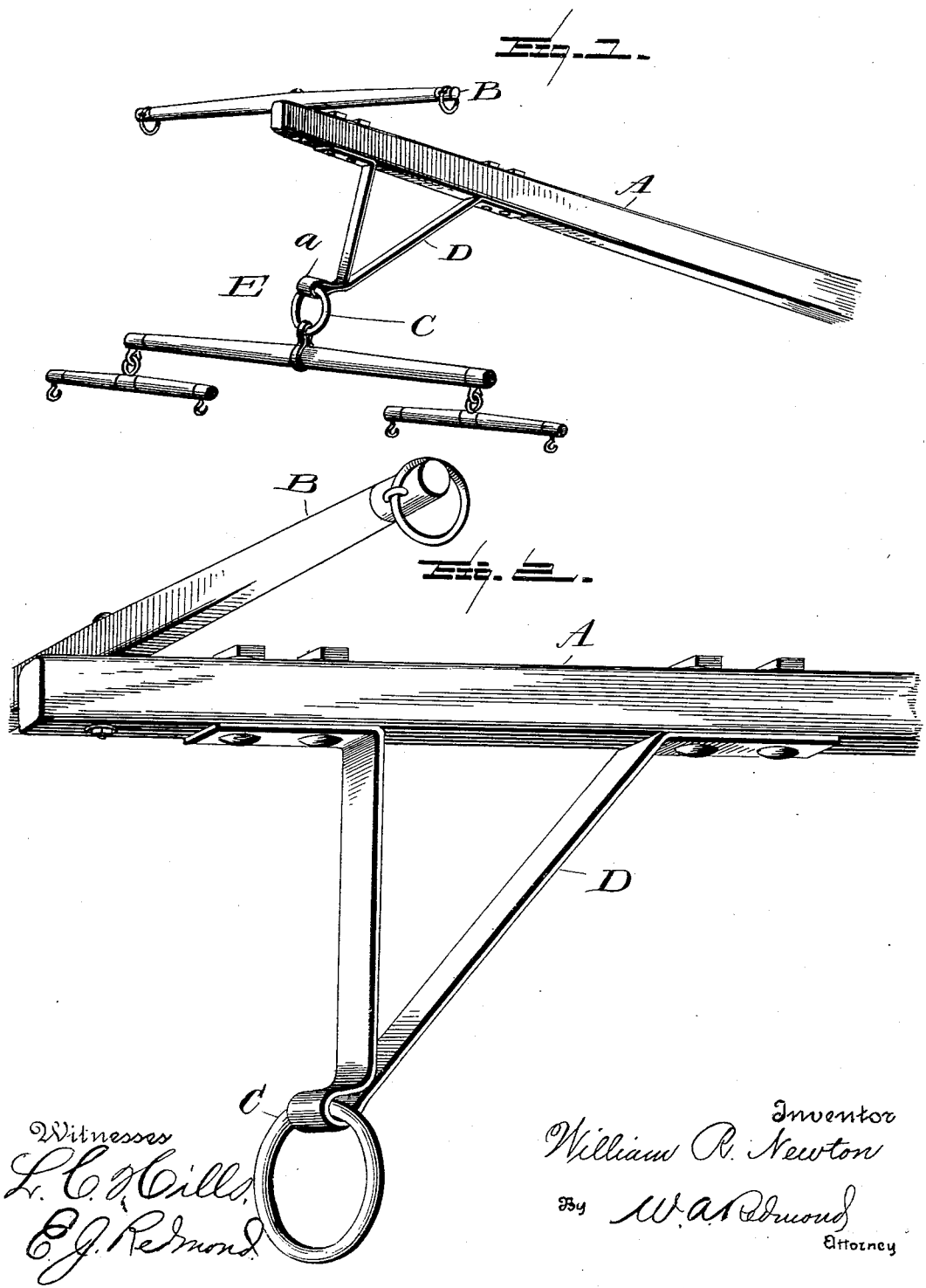

WILLIAM RIGGS NEWTON, OF SHELBYVILLE, TENNESSEE.

DRAFT ATTACHMENT FOR HARVESTING OR OTHER MACHINES.

SPECIFICATION forming part of Letters Patent No. 638,592, dated December 5, 1899.

Application filed July 6, 1899. Serial No. 722,982. (No model.)

*To all whom it may concern:*

Be it known that I, WILLIAM RIGGS NEWTON, a citizen of the United States, residing at Shelbyville, in the county of Bedford and State of Tennessee, have invented certain new and useful Improvements in Draft Attachments for the Lead-Horses for Harvesting or other Agricultural Machines; and I do declare the following to be a full, clear, and exact description of the invention, such as will enable others skilled in the art to which it appertains to make and use the same.

This invention relates to poles or tongues for self-binders or reapers or other harvesting or agricultural machines; and it has for its object to provide a simple and easily-applied attachment for removing the weight of the pole or tongue off the wheel-horses and transferring the side draft of the machine to the lead-horses; and it consists of the parts and combinations of parts hereinafter described and claimed.

In the accompanying drawings, forming a part of this specification, Figure 1 is a perspective view of the outer end of a pole or tongue, showing my attachment applied thereto and a doubletree for the lead-horses hung to the attachment; and Fig. 2 is a similar view showing the attachment on a larger scale with the doubletree removed.

Similar letters refer to similar parts in both views.

Referring to the drawings, A represents a pole or tongue of the ordinary or any desired form, to which the neck-yoke B is connected in the usual manner, and the said pole or tongue is to be coupled to the machine in any desired or common manner.

So far as I am aware it is the general practice to connect the lead-horses to the end of the tongue or pole of harvesters by a doubletree or a chain, to the ends of which the singletrees, generally called "stretchers," are attached, the pole or tongue being supported directly through the neck-yoke by the wheel-horses, which also sustain the side draft of the machine. Now, as stated above, it is the object of my invention to transfer the weight of the pole or tongue and the side draft of the machine from the wheel-horses to the lead-horses of the team and wholly relieve the wheel-horses from such burdens, and this I accomplish by connecting the doubletree for the lead-horses to the pole at a point below the line of draft of the machine in such a manner that the pulling of the lead-horses will raise the end of the pole or tongue, thus taking the weight off the wheel-horses, and as the lead-horses are pulling direct through the attachment from the end of the tongue it transfers the side draft of the machine from the wheel-horses to the lead-horses.

In carrying out my invention I secure by bolts or otherwise to the under side of the pole or tongue, and generally at a point from six to ten inches or any desired distance from its outer end or free end, a bracket-shaped iron D, the ends of which are bent or otherwise adapted to rest flat against the pole or tongue and through which the bolts are passed or connected otherwise to secure the iron rigidly to the pole or tongue. The iron extends about ten or twelve inches downward from the pole, and at its lower end a loop $a$ is formed in the iron D to receive the ring C, to which the doubletree E is connected, as shown; but it is evident that it may be formed into a hook and the doubletree connected therewith without departing from the spirit of my invention. Thus it will be seen that the point of attachment of the lead-horses is below the line of draft of the machine and that the pull of the lead-horses necessarily raises or lifts the pole or tongue.

Having thus described my invention, what I claim as new, and desire to secure by Letters Patent, is—

1. A pole or tongue for agricultural machines having a bracket-shaped iron projecting downwardly from its outer end and provided with means for the attachment of a doubletree for the lead-horses thereto.

2. A pole or tongue for agricultural machines having a bent iron secured to its under side near its outer end, said end projecting downwardly from the pole and being formed for the attachment of a doubletree thereto, whereby the lead-horses may be connected to the machine at a point below the normal line of draft thereto.

In testimony whereof I affix my signature in presence of two witnesses.

WILLIAM RIGGS NEWTON.

Witnesses:
R. W. CLARK,
T. J. STUTE.